United States Patent Office 2,915,556
Patented Dec. 1, 1959

2,915,556

2,2'-THIOBIS(3-CHLORO-N,N'-DIALKYL-2-BUTENE-1,4-DIAMINE)

Howard Johnston, Concord, Calif., assignor to The Dow Chemical Company, Midland, Mich., a corporation of Delaware No Drawing. Application August 4, 1958
Serial No. 753,104

3 Claims. (Cl. 260—583)

The present invention is directed to the 2,2'-thiobis(3-chloro-N,N'-dialkyl-2-butene-1,4-diamines) corresponding to the formula RHN—CH$_2$—CCl=C—CH$_2$NHR
|
S
|
RHN—CH$_2$—CCl=C—CH$_2$NHR wherein R represents an alkyl radical containing from 10 to 14 carbon atoms, inclusive. These novel compounds are low melting solids which are somewhat soluble in many organic solvents such as acetone and hexane and of low solubility in water. They have been found to be useful as parasiticides and are adapted to be employed as active toxic constituents of compositions for the control of many bacterial, fungal and insect organisms such as mites, nematodes and *Alternaria solani*.

The new compounds may be prepared by causing a reaction between a primary alkylamine containing from 10 to 14 carbon atoms, inclusive, and a bis(haloalkenyl) sulfide corresponding to the formula X—CH$_2$—CCl=C—CH$_2$X
|
S
|
X—CH$_2$—CCl=C—CH$_2$X wherein X represents bromine or chlorine. In such reaction, an alkylamino group is substituted for the halogen atoms on the terminal carbon atoms of the bis(haloalkenyl) sulfide with the production of the desired product and hydrogen halide of reaction. Good results are obtained when four molecular proportions of the primary alkylamine are reacted with one molecular proportion of the bis(haloalkenyl) sulfide in sufficient excess of the primary alkylamine to act as acceptor for by-product, hydrogen halide. This excess amounts to at least four molecular proportions of primary alkylamine for each molecular proportion of the bis(haloalkenyl) sulfide reactant. The reaction is carried out in an inert organic solvent such as hexane as reaction medium, and takes place smoothly in the temperature range of from 15° to 50° C.

In carrying out the reaction, the alkylamine and bis(haloalkenyl) sulfide are mixed and blended together in the reaction solvent and the resulting mixture maintained for a period of time at a temperature of from 15° to 50° C. Upon completion of the reaction, the reaction mixture is filtered to separate by-product alkylamine hydrohalide, and the solvent is thereafter recovered and separated from the filtrate by evaporation or fractional distillation. As a result of these operations, the desired product is obtained as a solid residue which may be further purified by conventional methods.

The following examples merely illustrate the invention and are not to be construed as limiting.

*Example 1.—2,2'-thiobis(3-chloro-N,N'-didodecyl-2-butene-1,4-diamine)*

CH$_3$(CH$_2$)$_{11}$—HN—CH$_2$—CCl=C—CH$_2$NH(CH$_2$)$_{11}$CH$_3$
|
S
|
CH$_3$(CH$_2$)$_{11}$—HN—CH$_2$—CCl=C—CH$_2$NH(CH$_2$)$_{11}$CH$_3$

Dodecylamine (44.5 grams; 0.24 mole) was dissolved in 100 milliliters of hexane and the resulting solution mixed and blended with 10.5 grams (0.03 mole) of bis-[2,3-dichloro-1-(chloromethyl)-propenyl] sulfide (melting at 72° to 73° C.) dissolved in 50 milliliters of hexane. The mixing and blending was carried out with stirring and at a room temperature. The reaction mixture was then set aside for 24 hours at room temperature and thereafter filtered to separate dodecylamine hydrochloride. The filtrate was thereafter subjected to fractional distillation at 40° C. and under a pressure of 3 milliliters to separate the solvent and obtain the 2,2'-thiobis(3-chloro-N,N'-didodecyl-2-butene-1,4-diamine) product as a residue. This product was a reddish, waxy solid melting at about 35° C. and containing carbon, hydrogen, nitrogen, and chlorine contents of 71.1, 11.9, 6.06, and 7.82 percent as compared to theoretical contents of 71.3, 11.9, 5.94, and 7.52 percent, respectively.

*Example 2.—2,2'-thiobis(3-chloro-N,N'-ditetradecyl-2-butene-1,4-diamine)*

In the manner exactly as described in Example 1, 8 moles of tetradecylamine is reacted with 1 mole of bis[3-bromo-2-chloro-1-(bromomethyl)-propenyl] sulfide (melting at 95–96° C.) to obtain a 2,2'-thiobis(3-chloro-N,N'-ditetradecyl-2-butene-1,4-diamine) product as a solid material having a molecular weight of 1056.

In a similar manner other 2,2'-thiobis(3-chloro-N,N'-dialkyl-2-butene-1,4-diamine) products may be prepared of which the following are representative:

2,2'-thiobis(3-chloro - N,N' - didecyl - 2,2' - butene-1,4-diamine) by reacting decylamine with bis[2,3-dichloro-1-(chloromethyl)-propenyl] sulfide.

2,2'-thiobis(3-chloro - N,N' - ditridecyl - 2 - butene-1,4-diamine) by reacting tridecylamine with bis[3-bromo-2-chloro-1-(bromomethyl)-propenyl] sulfide.

2,2'-thiobis(3-chloro - N,N' - diundecyl - 2 - butene-1,4-diamine) by reacting undecylamine with bis[2,3-dichloro-1-(chloromethyl)-propenyl] sulfide.

The new compounds have been tested and found to be useful as parasiticides. For such use, the products may be dispersed on an inert finely divided solid and employed as dusts. Also, such mixtures may be dispersed in water with the aid of a wetting agent and the resulting aqueous suspensions employed as sprays. In other procedures, the products may be employed as constituents in oil in water emulsions or water dispersions with or without the addition of wetting, dispersing, and emulsifying agents. In representative operations, aqueous spray compositions containing 0.25 pound of 2,2'-thiobis(3-chloro-N,N'-didodecyl-2-butene-1,4-diamine) per 100 gallons of ultimate mixture give 100 percent kills of Tomato Early Bright (*Alternaria solani*) on tomato plants without appreciable injury to the foliage of the plants.

The bis(haloalkenyl) sulfide compounds employed as intermediates in accordance with the teachings of the present invention may be prepared by reacting one molecular proportion of sulfur dichloride with one molecular proportion or 1,4-dichloro-2-butyne or 1,4-dibromo-2-butyne. The reaction is somewhat exothermic and takes place smoothly at temperatures of from 10° to 50° C. In carrying out the reaction, the sulfur dichloride is added slowly portionwise to the 1,4-dihalo-2-butyne, and the resulting mixture maintained for a period of time at the contacting temperature range. Upon completion of the reaction, the reaction mixture may be concentrated

I claim:
1. A 2,2'-thiobis(3-chloro-N,N'-dialkyl-2-butene-1,4-diamine) corresponding to the formula
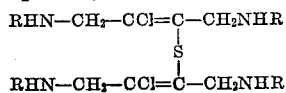
wherein R represents an alkyl radical containing from 10 to 14 carbon atoms, inclusive.
2. 2,2'-thiobis(3-chloro-N,N'-didodecyl-2-butene-1,4-diamine).
3. 2,2'-thiobis(3-chloro-N,N'-ditetradecyl-2-butene-1,4-diamine).
No references cited.